US008000944B2

(12) United States Patent
Yu

(10) Patent No.: US 8,000,944 B2
(45) Date of Patent: Aug. 16, 2011

(54) NON-FINITE ELEMENT IMPLEMENTATION OF THE FINITE ELEMENT PROJECTION IN TWO DIMENSIONS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 561 days.

(21) Appl. No.: 12/048,157

(22) Filed: Mar. 13, 2008

(65) Prior Publication Data
US 2009/0234624 A1    Sep. 17, 2009

(51) Int. Cl.
G06F 17/50    (2006.01)
G06F 17/10    (2006.01)
(52) U.S. Cl. .................................. 703/2; 703/6; 703/9
(58) Field of Classification Search ............... 703/2, 6, 703/9
See application file for complete search history.

(56) References Cited

U.S. PATENT DOCUMENTS

| | | | |
|---|---|---|---|
| 4,596,917 A | 6/1986 | Nied et al. | |
| 5,877,777 A | 3/1999 | Colwell | |
| 6,304,835 B1 | 10/2001 | Hiramatsu et al. | |
| 6,516,292 B2 | 2/2003 | Yahalom | |
| 6,600,565 B1 | 7/2003 | Suresh et al. | |
| 6,865,523 B2 | 3/2005 | Varghese et al. | |
| 7,085,695 B2 | 8/2006 | Yu et al. | |
| 7,117,138 B2 * | 10/2006 | Yu et al. | 703/9 |
| 7,149,671 B2 | 12/2006 | Lim et al. | |
| 7,243,057 B2 | 7/2007 | Houston et al. | |
| 7,251,591 B2 * | 7/2007 | Yu et al. | 703/6 |
| 7,254,523 B2 * | 8/2007 | Yu | 703/9 |
| 2004/0167757 A1 * | 8/2004 | Struijs | 703/2 |
| 2005/0114104 A1 | 5/2005 | Friedl et al. | |
| 2005/0243117 A1 | 11/2005 | Yu | |
| 2006/0070434 A1 | 4/2006 | Yu | |
| 2006/0259288 A1 | 11/2006 | Yu | |
| 2007/0073527 A1 | 3/2007 | Flandrin et al. | |
| 2007/0136042 A1 | 6/2007 | Yu | |
| 2008/0103742 A1 * | 5/2008 | Yu | 703/9 |

FOREIGN PATENT DOCUMENTS

| | | |
|---|---|---|
| EP | 1015943 B1 | 3/2004 |
| EP | 1655679 A1 | 5/2006 |
| JP | 63-284686 | 11/1988 |

* cited by examiner

*Primary Examiner* — Thai Phan

(57) ABSTRACT

Embodiments of the present invention provide a finite difference method, a finite element projection, and a non-finite-element implementation of the finite element projection for solving the incompressible continuity equation on quadrilateral grids to obtain pressure and fluid velocity. An exemplary apparatus for simulating and analyzing the flow of an incompressible fluid is also provided. More particularly, embodiments of the present invention provide a non-finite-element-method (non-FEM) to implement the finite element projection to obtain a linear system whose coefficient matrix has an average bandwidth of five, in comparison to the finite difference scheme using conventional finite element projection and implementation with a bandwidth of nine. A two-dimensional-five-point-stencil-based non-FEM discretization is formulated to enforce the incompressible continuity equation. A shape function that is different from a weighting function used in the incompressible continuity equation is utilized to guarantee the five-point-stencil discretization is possible. The smaller bandwidth of the non-FEM scheme requires less computing resources and can compute the results in a reduced time duration, due to the simpler matrix to solve.

19 Claims, 10 Drawing Sheets

NON-FINITE ELEMENT IMPLEMENTATION OF THE FINITE ELEMENT PROJECTION IN TWO DIMENSIONS

CROSS REFERENCE TO RELATED APPLICATION

This application is related to U.S. Pat. No. 7,117,138, filed on Mar. 14, 2003 and entitled "Coupled Quadrilateral Grid Level Set Scheme For Piezoelectric Ink-Jet Simulation," and U.S. Pat. No. 7,085,695, filed on Mar. 22, 2002 and entitled "A Slipping Contact Line Model and the Mass-Conservative Level Set Implementation for Ink-Jet Simulation." Both related applications are incorporated herein by reference.

BACKGROUND

1. Field of the Invention

The present invention relates to a model and accompanying algorithm to simulate and analyze ink ejection from a piezoelectric print head. More particularly, the model of this invention includes a quadrilateral grid for finite-difference-based ink-jet simulation where the algorithm is designed to solve a set of partial differential equations for two-phase flows that have been newly developed on the quadrilateral grid. The quadrilateral grid is transformed to a uniform square grid, and the derivatives of various parameters (e.g., the velocities, pressure, and level set) in the newly developed partial differential equations are calculated on the uniform square grid. A stable and powerful numerical algorithm is developed to solve the derived equations. The simulation model may be embodied in software, hardware or combination thereof and may be implemented on a computer or other processor-controlled device.

2. Description of the Related Art

Results of computational fluid dynamics (CFD) ink-jet simulation have been very useful in the design of piezoelectric ink-jet print heads. FIG. 1 shows how a practical inkjet simulation may be carried out. An analytical tool such as an equivalent circuit 11 receives as an input the dynamic voltage to be applied to the piezoelectric (PZT) actuator and simulates the ink behavior under the influence of the ink cartridge, supply channel, vibration plate, and PZT actuator. That is, from the input voltage and an ink flow rate, the equivalent circuit 11 calculates an inflow pressure that drives the CFD code 12. The CFD code 12 then solves the governing partial differential equations, i.e., the incompressible Navier-Stokes equations for two-phase flows, for fluid velocity, pressure and interface position, and feeds back the ink flow rate to the equivalent circuit. The sequence is repeated as long as needed.

A CFD code has been used by the assigned to solve the Navier-Stokes equations. Such code employs the volume of fluid method (VOF) to take into account the ink-air interface. VOF performs fairly well with regard to mass conversation but is not so accurate on surface tension aspects of fluid flow, especially when the ink droplet is smaller than 5 pico liters. However, since the capability of ejecting ultra small ink droplets is essential for any photo quality ink-jet printer today, an improved modeling method which included the level set method was adopted by the assigned to more accurately capture the ink-air interface in CFD simulations. Since there is a mathematical relation between the level set and the interface curvature, and hence the surface tension, the level set method excels whenever surface tension is important.

Because solving the level set equation by finite element (FE) analysis usually results in a serious mass conservation problem, finite difference analysis is usually the best choice among numerical schemes to be used with the level set method. FIG. 2 shows a typical square grid (or rectangular) for a finite difference analysis. Since the wall of the narrowing section of the modeled nozzle is not parallel to any coordinate axis, the discretized computational domain cannot faithfully fit the real nozzle wall. The body-fitted quadrilateral grid in FIG. 3 does not have that problem. While a non-square (or non-rectangular) quadrilateral grid like the one in FIG. 3 can be naturally handled in finite element analysis, performing a finite difference analysis on such a grid is very difficult.

It is in this context that embodiments of the present invention arise.

SUMMARY

Embodiments of the present invention provide a finite difference method, a finite element projection, and a non-finite-element implementation of the finite element projection for solving the incompressible continuity equation on quadrilateral grids to obtain pressure and fluid velocity. An exemplary apparatus for simulating and analyzing the flow of an incompressible fluid is also provided. More particularly, embodiments of the present invention provide a non-finite-element-method (non-FEM) to implement the finite element projection to obtain a linear system whose coefficient matrix has an average bandwidth of five, in comparison to the finite difference scheme using conventional finite element projection and implementation with a bandwidth of nine. A two-dimensional-five-point-stencil-based discretization is formulated to enforce the incompressible continuity equation. A shape function that is different from a weighting function used in the incompressible continuity equation is utilized to guarantee the five-point-stencil discretization is possible. The smaller bandwidth of the non-FEM scheme requires less computing resources and can compute the results in a reduced time duration, due to the simpler matrix to solve.

It should be appreciated that the present invention can be implemented in numerous ways, including as a method, a system, or a device. Several inventive embodiments of the present invention are described below.

In one embodiment, a method for simulating and analyzing fluid ejection from a channel is provided. There is a boundary between a first fluid that flows through the channel and a second fluid. The method includes (a) transforming, for a given channel geometry, a quadrilateral grid in a physical space to a uniform square grid in a computational space. The method also includes (b) performing finite difference analysis on the uniform rectangular grid to solve equations governing the flow of at least the first fluid through the channel. The finite element analysis of an incompressible continuity equation of the equations, for projection of fluid velocity of at least the first fluid, is formulated by a two-dimensional (2-D)-five-point-stencil-based non-finite-element-method (non-FEM) discretization to make matrices to solve having a bandwidth of five. The method further includes (c) inverse transforming results of the finite difference analysis back to the quadrilateral grid in the physical space. In addition, the method includes (d) simulating the flow of the first fluid through at least a portion of the channel, and ejection therefrom, based on the results of the finite difference analysis.

In one embodiment, weighting functions of the incompressible continuity equation have a value of 1 at a center node and have values of 0 at four surrounding nodes of each 2-D five-point stencil. The weighting functions are piecewise linear with coordinates of the uniform square grid. In another embodiment, shape functions, which are different from the weighting functions, are utilized for interpolating the pressure in operation (b), and the shape functions have values of 1 at their own associated nodes and values of zero at other nodes. The shape functions are piecewise linear with coordinates of the uniform square grid. The weighting functions and the shape functions are different to guarantee the two-dimensional (2-D)-five-point-stencil-based non-FEM discretization can be achieved.

In another embodiment, an apparatus for simulating and analyzing fluid ejection from a channel is provided. There is a boundary between a first fluid that flows through the channel and a second fluid is provided. The apparatus includes one or more components or modules configured to transform, for a given channel geometry, a quadrilateral grid in a physical space to a uniform square grid in a computational space. The apparatus also includes one or more components or modules configured to perform finite difference analysis on a uniform rectangular grid to solve equations governing the flow of at least the first fluid through the channel. The finite element analysis of an incompressible continuity equation of the equations, for projection of fluid velocity of at least the first fluid, is formulated by a 2-D-five-point-stencil-based non-FEM discretization to make matrices to solve having a bandwidth of five. The apparatus further includes one or more components or modules configured to inverse transform results of the finite difference analysis back to the quadrilateral grid in the physical space. In addition, the apparatus includes one or more components or modules configured to simulate the flow of the first fluid through, and ejection from, the channel based on the finite difference analysis.

In another embodiment, a machine-readable medium having a program of instructions for directing a machine to perform a method for simulating and analyzing fluid ejection from a channel is provided. There is a boundary between a first fluid that flows through the channel and a second fluid. The program of instructions include (a) instructions for transforming, for a given channel geometry, a quadrilateral grid in a physical space to a uniform rectangular grid in a computational space. The program of instructions also include (b) instructions for performing finite difference analysis on the uniform rectangular grid to solve equations governing the flow of at least the first fluid through the channel. The finite element analysis of an incompressible continuity equation of the equations, for projection of fluid velocity of at least the first fluid, is formulated by a 2-D-five-point-stencil-based non-FEM discretization to make matrices to solve having a bandwidth of five. The program of instructions further include (c) instructions for inverse transforming results of the finite difference analysis back to the quadrilateral grid in the physical space. In addition, the program of instructions include (d) instructions for simulating the flow of the first fluid through at least a portion of the channel, and ejection therefrom, based on the results of the finite difference analysis.

In yet another embodiment, a method of simulating an incompressible fluid by performing finite difference analysis is provided. The method includes (a) transforming a quadrilateral grid in a physical space to a uniform rectangular grid in a computational space. The method also includes (b) performing finite difference analysis on the uniform rectangular grid to solve equations governing the flow of the incompressible fluid. The finite element analysis of a projection step is formulated by a 2-D-five-point-stencil-based non-FEM discretization to make matrices to solve having a bandwidth of five. The method further includes (c) inverse transforming results of the finite difference analysis back to the quadrilateral grid in the physical space. In addition, the method includes (d) simulating the incompressible fluid based on the results of the finite difference analysis.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION

Figure 1:
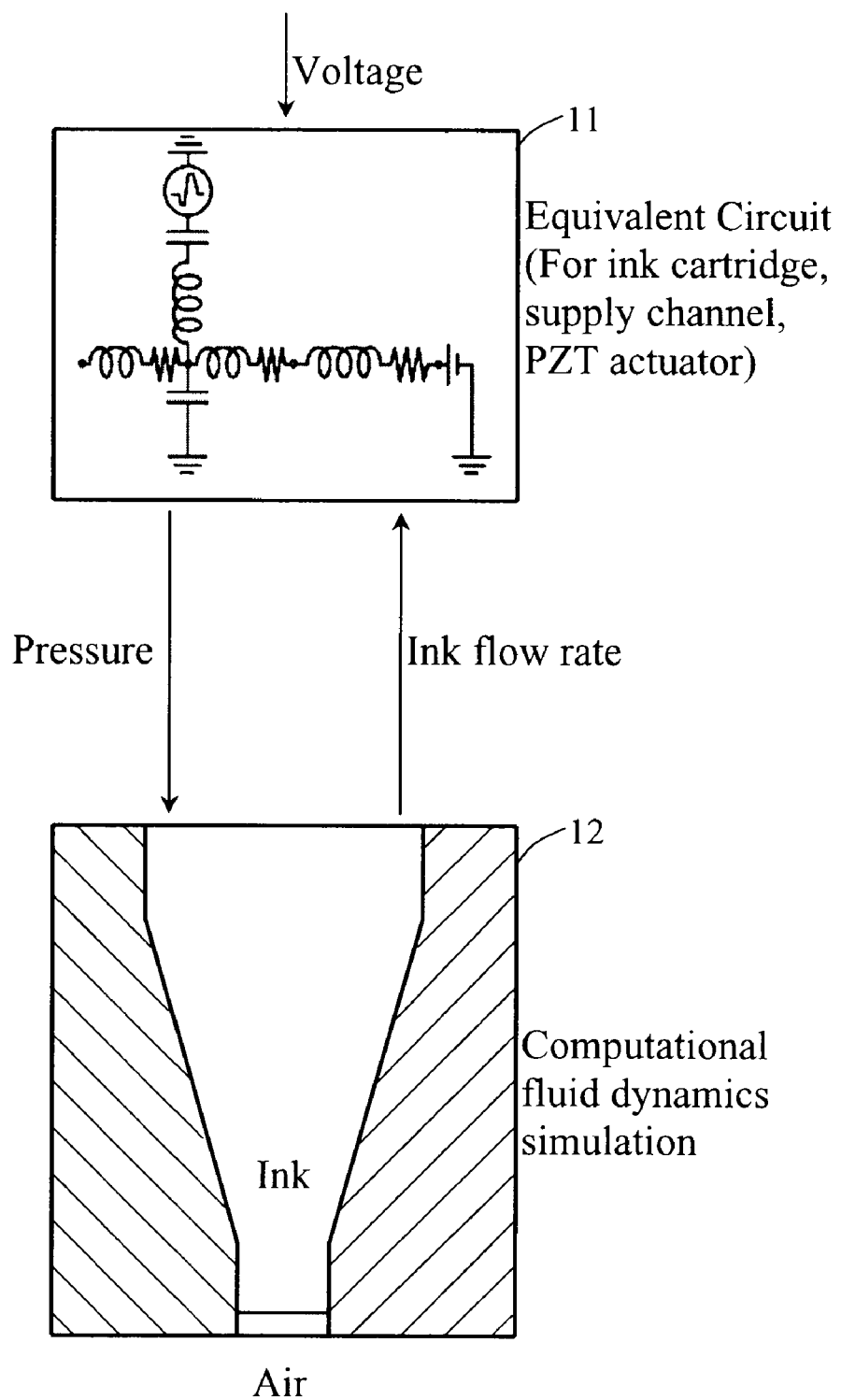
FIG. 1 shows a schematic block diagram illustrating the inter-relationship of an equivalent circuit with a computational fluid dynamics simulation, in accordance with one embodiment of the present invention.
Figure 2:
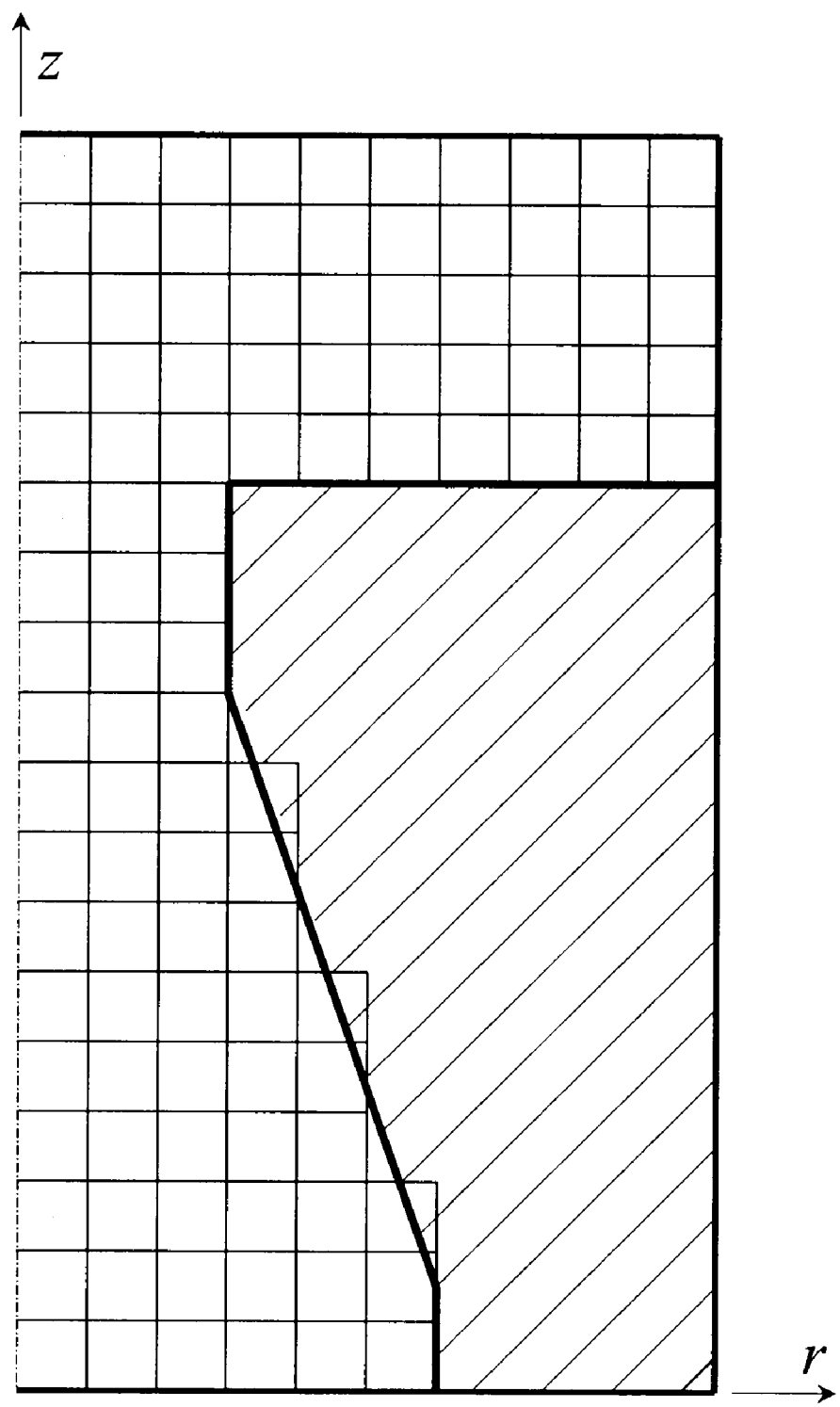
FIG. 2 shows a typical square grid for inkjet simulation, in accordance with one embodiment of the present invention.

In the following description, numerous specific details are set forth in order to provide a thorough understanding of the present invention. However, it will be apparent to those skilled in the art that the present invention may be practiced without some of these specific details. In other instances, well known process operations and implementation details have not been described in detail in order to avoid unnecessarily obscuring the invention.

I. Introduction

The model of this invention includes a quadrilateral grid for finite-difference-based ink-jet simulation. An accompanying algorithm is designed to solve the coupled Navier-Stokes equations and level set equations for two-phase flows that have been newly developed on the quadrilateral grid.

Governing partial differential equations, including the viscosity term, the surface tension term, and the level set convection equation for two-phase flows, are derived on the quadrilateral grid. A discrete transformation (mapping) is constructed so that the partial differential equations derived on the quadrilateral grid in physical space are transferred to the uniform square grid in a computational space to enable finite-difference-based ink-jet simulation. Since the grid in the computational space is square, numerical finite difference differentiation can be easily done. Although the governing equations assume a more complicated form after the transformation, the ease with which the equations can be solved in the computational space more than offsets the increased complication. A stable and powerful numerical algorithm is developed to solve the derived and transferred equations. In particular, the derivatives of the velocities, pressure, and level set are calculated on the uniform square grid in computational space.

II. Level Set Formulation

A. Governing Equations

The governing equations for two-phase flows include the continuity equation (1) and the Navier-Stokes equations (2), which are set forth in the Appendix along with the other numbered equations referenced in the following discussion. In these equations, the rate of deformation tensor and the fluid velocity are respectively defined in equations (3). D/Dt is the Lagrangian time derivative, $\rho$ the relative density, p the pressure, $\mu$ the relative dynamic viscosity, $\sigma$ the surface tension coefficient, $\kappa$ the curvature, $\delta$ the Dirac delta function, and $\phi$ the level set.

A level set formulation is used to define the interface between the two fluids, e.g., ink and air, and hence the relative density, relative dynamic viscosity, and curvature are all defined in terms of the level set $\phi$ as in equation (4).

Here, the level set function $\phi$ is initialized as the signed distance to the interface, i.e., the level set value is the shortest distance to the interface on the liquid side and is the negative of the shortest distance on the air side. The unit normal on the interface, drawn from fluid 2 into fluid 1, and the curvature of the interface can be expressed in terms of $\phi$ as in equation (5).

To make the governing equations dimensionless, the following definitions, as set forth in equation (6), are chosen. The primed quantities are dimensionless, and L, U, $\sigma_1$, $\mu_1$, are respectively the characteristic length, characteristic velocity, density of fluid 1, and dynamic viscosity of fluid 1. The characteristic velocity and characteristic length can be arbitrarily chosen, as they do not influence the result of simulation.

Substituting the relationships of equation (6) into equations (1) and (2), and dropping the primes, yields equations (7) and (8), where the relative density ratio $\rho(\phi)$, relative viscosity ratio $\mu(\phi)$, Reynolds number Re, and Weber number We are defined by equations (9). Since the interface moves with the fluid, the evolution of the level set is governed by equation (10).

Since equations (5), (7) and (8) are expressed in terms of the vector notation, they assume the same form in Cartesian coordinates.

B. Governing Equations on Quadrilateral Mesh

The primary interest here is in finite difference analysis in reasonably complex geometries, for which a square (or rectangular) grid may not work well. The focus is therefore a general quadrilateral grid formulation. This can be done by carefully transforming the viscosity and surface tension terms.

Figure 4:
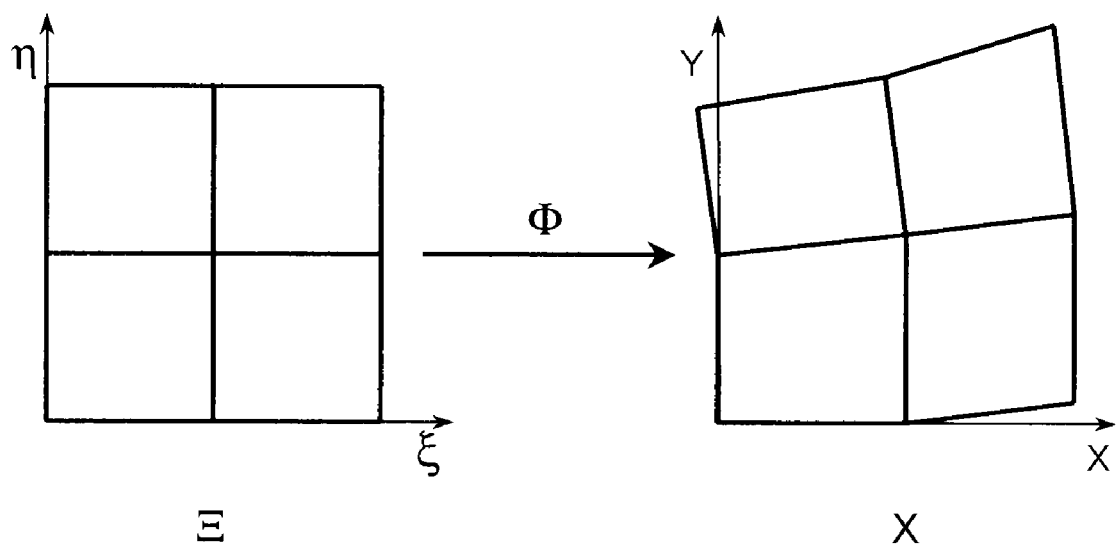
FIG. 4 shows the transformation of square grid points to quadrilateral grid points, in accordance with one embodiment of the present invention.

Consider a continuous transformation $\Phi$ which maps the grid points in a square computational space $\Xi=(\xi,\eta)$ to the quadrilateral physical space X=(x,y) according to equation (11) and as shown in FIG. 4. The Jacobian and the transformation matrix are defined by equations (12), where g=1 for the 2-D Cartesian coordinate system. For the convenience of future discussion, we also define the transformed convection velocity as in equation (13). The above definitions for two-dimensional Cartesian system can be easily extended to the axi-symmetric coordinate system by the substitution shown in equation (14).

The derivation of the governing equations on the computational space will now be described in the following subsections.

B.1. Pressure Gradient

The pressure gradient on the quadrilateral grid can be obtained by the chain rule as shown in equations (15).

B.2. Continuity Condition

The divergence-free continuity condition on the quadrilateral grid is shown in equation (16). To prove this, expand the right hand side as shown in equations (17).

B.3. Convection Term

By combining the transformations in equations (15) and (17), the convection term set forth in equation (18) is obtained. The convection term in the level set equation can be transformed similarly.

B.4. Viscosity Term

For the transformation of the viscosity term for two-phase flows, the identity set forth in equation (19) is needed. Noting the relationship in equation (20) yields equation (21). The first term on the right hand side of equation (21) vanishes for single-phase flows with constant viscosity. However, it plays an important role for two-phase flows. In a 2-D Cartesian coordinate system, the Laplacian operator in the second term is as set forth in equation (22). By noting the relationships in equations (23) and (24), equation (25) is obtained. By combining equations (21) and (25) the viscosity term in computational space is obtained. The viscosity term is set forth in equation (26).

B.5. Curvature and Surface Tension

Given the relationship in equation (27), the surface tension term is shown in equation (28). Combining equations (17) to (28), the governing equations on the quadrilateral grid are obtained. These governing equations are set forth in equation (29), where the viscosity terms are as given in equation (26).

It will be noted that equations (15) to (29) are derived for a quadrilateral grid in the 2-D Cartesian coordinate system. Also, equation (25) can be checked by reducing the computational space $\Xi=(\xi,\eta)$ to the physical space X=(x, y). For this case, the transformation matrix reduces to the identity matrix and the Jacobian to g.

C. Boundary Conditions

On solid walls it is assumed that the normal and tangential components of the velocity vanishes, although this assumption must be modified at the triple point. At both inflow and outflow, the formulation of this invention allows us to prescribe either the velocity (30) or the pressure (31) as boundary conditions. In equation (31), the symbol n denotes the unit normal to the inflow or outflow boundary. Time-dependent inflow conditions are provided by an equivalent circuit model, which mimics the charge-driven mechanism which forces ink from the bath into the nozzle.

D. Contact Models

At the triple point, where air and ink meet at the solid wall, the slipping contact line model as presented in related U.S. Pat. No. 7,085,695 referenced above is used.

E. Equivalent Circuit

In a piezo ink-jet print head, the formation of the ink droplet is controlled by a piezoelectric PZT actuator. Driven by the input voltage, the PZT pushes and then pulls the ink. To numerically simulate an ink-jet print head, a velocity or pressure at nozzle inflow must be specified. Various appropriate values of these parameters may be specified by the user before simulation, or such values may be the result of previous measurements taken at different voltages input to PZT, since this voltage value is known.

Another analytic tool that may be developed and used to obtain inflow pressures that may be used for simulation of the ink-jet print head is an equivalent circuit. Such an equivalent circuit determines inflow pressure based on input voltage and ink flow rate. For example, the ink flow rate and pressure can be taken as independent variables. Each component of the ink-jet print head, such as the nozzle, pressure chamber, vibration plate, PZT actuator, and ink cartridge is expressed in terms of the acoustics inertance, compliance, and acoustics resistance. These acoustics elements are finally transferred to their equivalent inductance, capacitance, and electric resistance to form an equivalent circuit. By solving the equivalent circuit and the flow equations in term a real ink-jet head can be simulated. Other suitable methods may also be used to obtain inflow pressure values that relate to the PZT input voltage.

III. Numerical Algorithms: Quadrilateral Grids

The numerical algorithm is now formulated on the quadrilateral grids. In the following, the superscript n (or n+1) denotes the time step, i.e., equation (32), and so on. Given quantities $u^n$, $p^n$, $\phi^n$, the purpose of the algorithm is to obtain $u^{n+1}$, $p^{n+1}$, $\phi^{n+1}$ which satisfy the condition of incompressibility. The explicit algorithm described herein is first-order accurate in time and second-order accurate in space.

A. Smearing of the Interface

Because of the numerical difficulty caused by the Dirac delta function and by the abrupt change of the density and viscosity across the interface, we have to replace the Heaviside unit step and Dirac delta functions with smoothed ones, i.e., to smear the interface a little bit. The Heaviside function is redefined by equation (33). By the relation between the Dirac delta and the Heaviside functions in (34), we can easily obtain the smoothed Dirac delta function.

B. Temporal Discretization

B.1. Level Set Update

The level set is updated first by equation (36). Once $\phi^{n+1}$ is obtained, $\phi^{n+1/2}$ is computed by equation (37).

B.2. Explicit Algorithm for Navier-Stokes Equations

In previous work, temporal discretization has been constructed as explicit for the advection term and semi-implicit for the viscosity term. The advantage of the semi-implicity is the second-order accuracy in time. The expense is that one needs to solve an extra non-symmetric linear system in each time step. In this invention, an explicit temporal discretization is applied to the viscosity term to reduce the CPU time, as set forth in equation (38). Using the definition of equation (39), the time-discretized Navier-Stokes equations can be written as set forth in equation (40).

We apply a second-order explicit Godunov scheme for the advection term and the central difference for the viscosity term in equation (39). They were explained in detail in U.S. Pat. No. 7,117,138. It is noticeable that the time-centered level set $\phi^{n+1/2}$ and the velocity $u^n$ for the evaluation of the (viscosity term)$^n$ is used. The determination of $u^*$ needs only field quantities at time step n.

Since the finite-element projection is used, for which the special quadrilateral formulation (40) is unnecessary, the corresponding equation in the physical grid is written as in equation (41).

B.3. Projection for $u^{n+1}$

To satisfy the incompressibility condition for time step n+1 the divergence operator is applied to both sides of equation (41). Due to the vanishing of the gradient of $u^{n+1}$, we have projection equation (42), which is elliptic. It reduces to a Poisson's equation if the density ratio $\rho(\phi^{n+1/2})$ is a constant.

The finite element formulation (FEM), shown in equation (43) where $\Gamma_1$ denotes all the boundary with given inflow or outflow velocity $u_{BC}$, is used to facilitate implementation. It can be seen by the divergence theory, that the implied boundary condition at $\Gamma_1$ is as shown in equation (44). It is noticeable that the second term at the right hand side of (43) vanishes if only boundary pressures are given at the inflow and outflow.

After the pressure $p^{n+1}$ is solved from equation (43), the velocity field $u^{n+1}$ can be obtained by equation (40). In equations (43), $\Omega$ denotes the solution domain, $\psi$ is the finite element weighting function (or testing function), p is the pressure, $\Delta t$ is the time step, $\rho$ is the density, $u^*$ is the intermediate velocity field, $\Gamma_1$ denotes all the boundary of $\Omega$ with inflow or outflow, $u^{BC}$ is the given boundary velocity, n is the unit vector normal to $\Gamma_1$, and superscripts n+1, n+½ are the time steps.

C. Spatial Discretization

Figure 5:
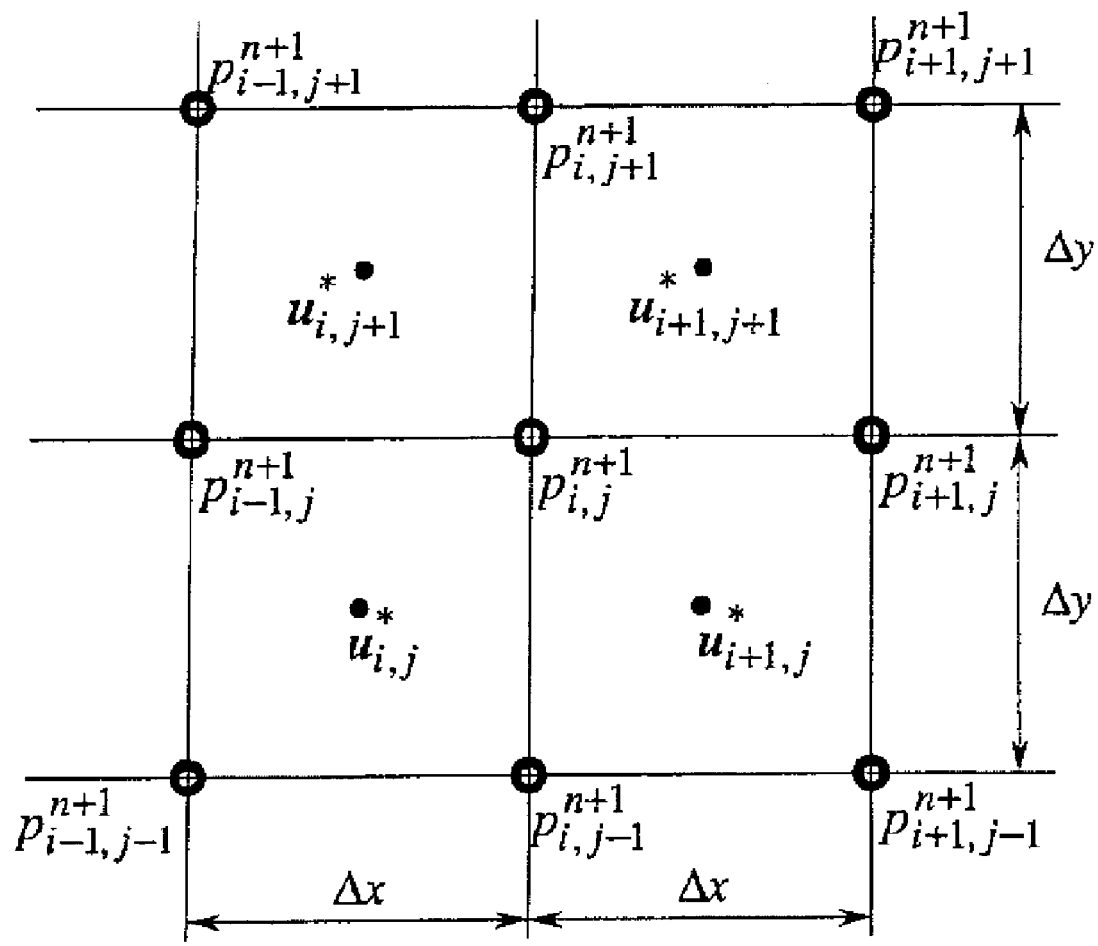
FIG. 5 shows the locations of pressure and intermediate velocities, in accordance with one embodiment of the present invention.

Aspects of spatial discretization that have been described in U.S. Pat. No. 7,117,138 that are applicable to the embodiments of the current invention are not duplicated here. Equation (43) is a Poisson's equation in the FE format. The left hand side (LHS) of equation (43) is an FEM equivalent of the Laplacian of pressure. The choice of the weighting function and the interpolation of discrete pressure and velocity are flexible. A usual first-order FEM implementation chooses to make the weighting function and the pressure piecewise bilinear and the intermediate velocity piecewise constant. A special case of quadrilateral grids, where the grids are uniform squares with $\Delta x=\Delta y=h$ in two space dimensions, is shown in FIG. 5. If the inflow/outflow term, and the time step superscript are omitted for simplicity in presenting the equation, the algebraic equation resulting from the discretization of equation (43) using the usual FEM implementation at node (i,j) is equation (45). Equation (45) consists of nine nodal pressures and four cell-center pairs of intermediate velocities. The left hand side (LHS) of equation (45) with nine nodal pressures is referred to as a nine-point Laplacian stencil. Assembling the nine-point stencil at all the nodes, a linear system of these discrete nodal pressure values can be obtained. The average bandwidth of the coefficient matrix of the linear system is nine.

C.1. Weighting Function

The numerical algorithm that includes the FEM projection and nine-point Laplacian stencil works well. However, an alternative implementation that is not a typical FEM implementation, but is easy and faster to construct. The alternative implementation has an average bandwidth of five. The alternative implementation takes less computing resources, such as central processing unit (CPU) and memories, to construct and shorter time to obtain results. The alternative implementation is explained below.

Figure 6:
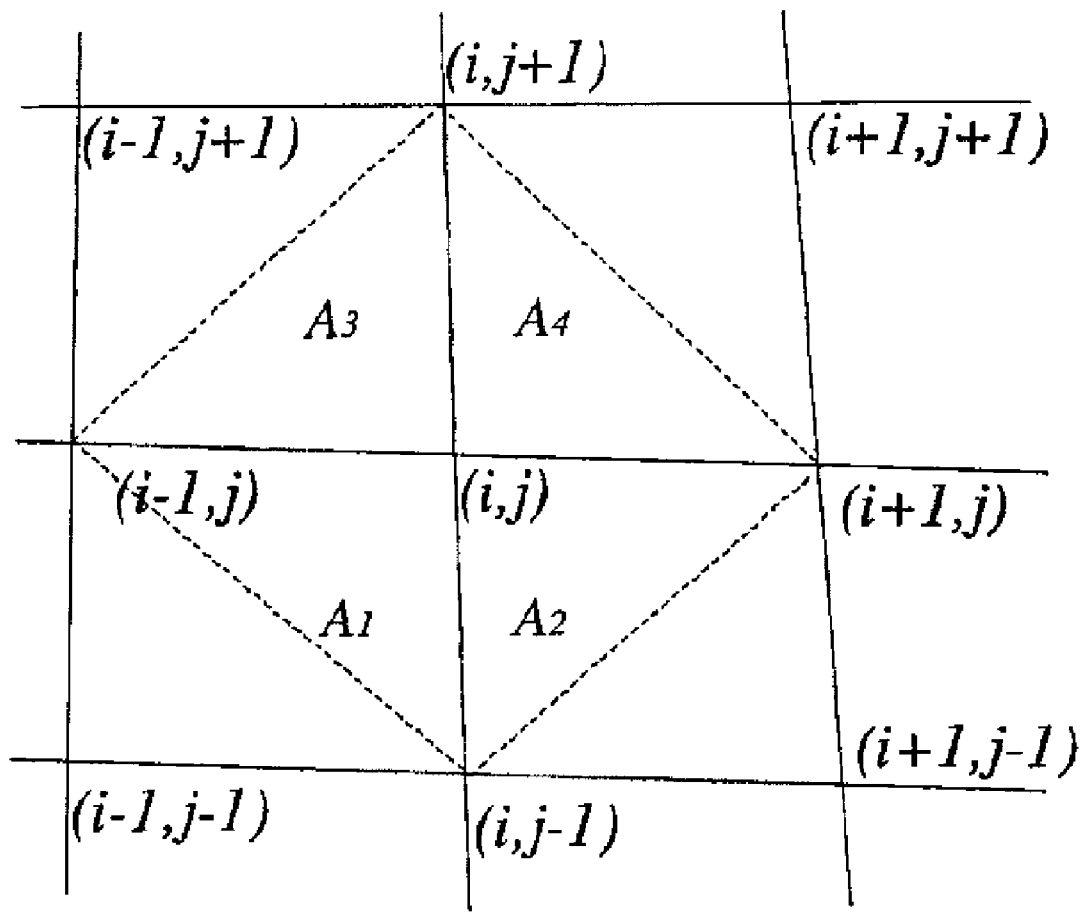
FIG. 6, shows the range of testing function at node (i,j) on a quadrilateral grid.

Referring to FIG. 6, a typical FEM weighting function (or testing function) $\psi_{i,j}$ at a node (i,j) is such that $\psi_{i,j}=1$ at node (i,j), but $\psi_{i,j}=0$ at any other nodes. In two space dimensions, one can easily construct bilinear, bicubic, or other Lagrangian type weighting functions. Using the bilinear Lagrangian weighting function as an example, the function $\psi_{i,j}$ is 1 at node (i,j) and it reduces smoothly to zero toward the edges defined by nodes (i−1,j−1), (i,j−1), (i+1,j−1), (i+1,j), (i+1,j+1), (i,j+1), (i−1,j+1), and (i−1,j). It is zero outside the boundary defined by the above set of nodes. To construct a five-point Laplacian stencil, one more restriction on the weighting function is needed so that it does not extend too broadly. $\psi_{i,j}$ is nonzero only in the area enclosed by the dash lines in FIG. 6. $\psi_{i,j}$ can be defined by equation (46), where a, b, c are coefficients solved from equations (47). a, b, c are described as $a_1$, $b_1$, $c_1$ in space $A_1$, as $a_2$, $b_2$, $c_2$ in space $A_2$, as $a_3$, $b_3$, $c_3$ in space $A_3$ and as $a_4$, $b_4$, $c_4$ in space $A_4$.

Figure 7:
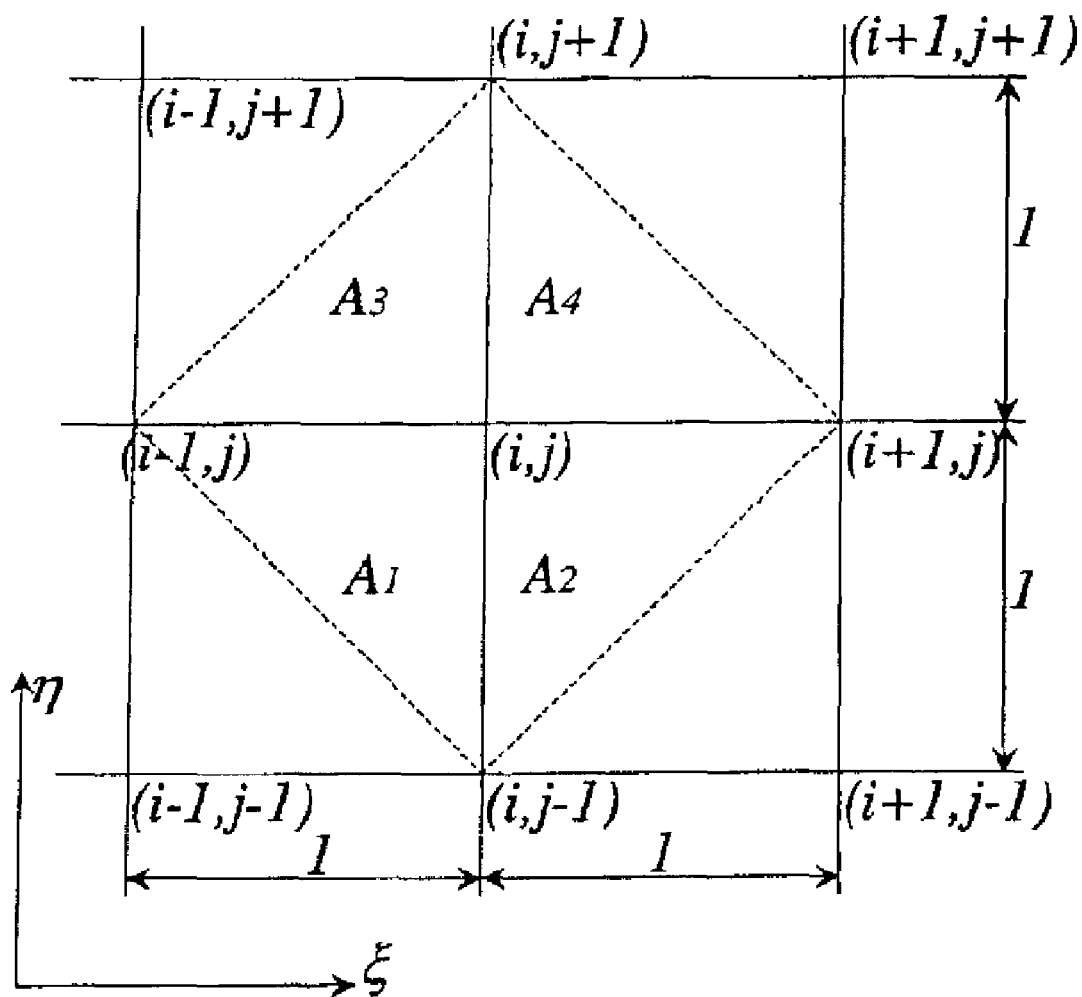
FIG. 7 shows uniform square grids in the computational space, in accordance with one embodiment of the present invention.

Since all the calculations for quadrilateral grids are performed in the computational space, where all the cells are unit squares (see FIG. 7), there is a corresponding weighting function in the computation space. The weighting function in the computational space is shown in equations (48) for different areas enclosed by the dash lines in FIG. 7.

C.2. Interpolation of Pressure

Normally, the same function is used to define the weighting function and interpolation in FEM implementation, which is called isoparametric FEM. However, an alternative implementation employing a function (a space function) that is not the same as the weighting function for pressure interpolation to guarantee the resulted Laplacian stencil being five-point is proposed to be used. Employing a space function that is different from the weighting function is needed to make the matrix have a bandwidth of five. Otherwise, the matrix bandwidth cannot be kept at five, instead would become nine. No prior disclosure by others is known to the inventor regarding using such a space function that is different from the weighting function in computing finite element analysis.

Using the area enclosed by dash lines in FIG. 6 as an example, pressure at (x,y) in different areas $A_1$, $A_2$, $A_3$, and $A_4$ can be interpolated by using equations (49). In equations (49), $\theta_{i,j}$, $\theta_{i+i,j}$, $\theta_{i,j-1}$, $\theta_{i-1,j}$, and $\theta_{i,j+1}$ are the shape functions associated with the node (i,j) and its immediate neighbors (i+1,j), (i, j−1), (i−1, j), and (i, j+1). These shape functions are different from the testing functions $\psi_{i,j}$. Shape functions used to construct the Laplacian stencil at node (i,j) are piecewise flat planes (or linear) whose values are 1 at their own associated nodes and zero at other nodes. For example, $\theta_{i+1,j}$ is a flat plane in $A_2$, and is a different plane in $A_4$. $\theta_{i+1,j}$ is continuous and its value is 1 at node (i+1,j) and zero at all other nodes (i,j), (i,j−1), (i−1,j), and (i,j+1). In terms of relationship, $\theta_{i+1,j}$ can be expressed as equation (50), wherein d, e, f are coefficients that are zero in $A_1$, $A_3$, and anywhere outside the region enclosed by the dash lines. In $A_2$ and $A_4$, the d, e, f coefficients can be solved from the matrixes of (51).

Similar to the previous section, the interpolation of pressure in the computational space can be expressed in equations (52) in different areas $A_1$, $A_2$, $A_3$ and $A_4$.

C.3. Implementation Formula for Quadrilateral Grids

Combining the weighting function explained in section C.1. and pressure interpolation explained in section C.2., the projection equation can be implemented to obtain a linear system with an average bandwidth of five. With the weighting function and the pressure interpolation, the LHS of equation (43) at node (i,j) becomes equation (53). In equation (53), the superscripts n+1 and n+½, which represent the time, have been omitted to simplify the writing of the equation. The first term at the RHS becomes equation (54). In equation (54), $T_{i,j}$ and $J_{i,j}$ are the transformation matrix and Jacobian defined in U.S. Pat. No. 7,117,138, which has been incorporated as a reference in its entirety. $J_{i,j}$ and $T_{i,j}$ are described in equations (55). The equation (53) associated with node (i,j) consists of pressure values at five nodes (i,j), (i+1, j), (i,j−1), (i−1,j), and (i, j+1), which are part of a five-point stencil.

If the quadrilateral grid reduces to a uniform square grid with $\Delta x = \Delta y$, the projection equation can be simplified to become equation (56).

Figure 3:
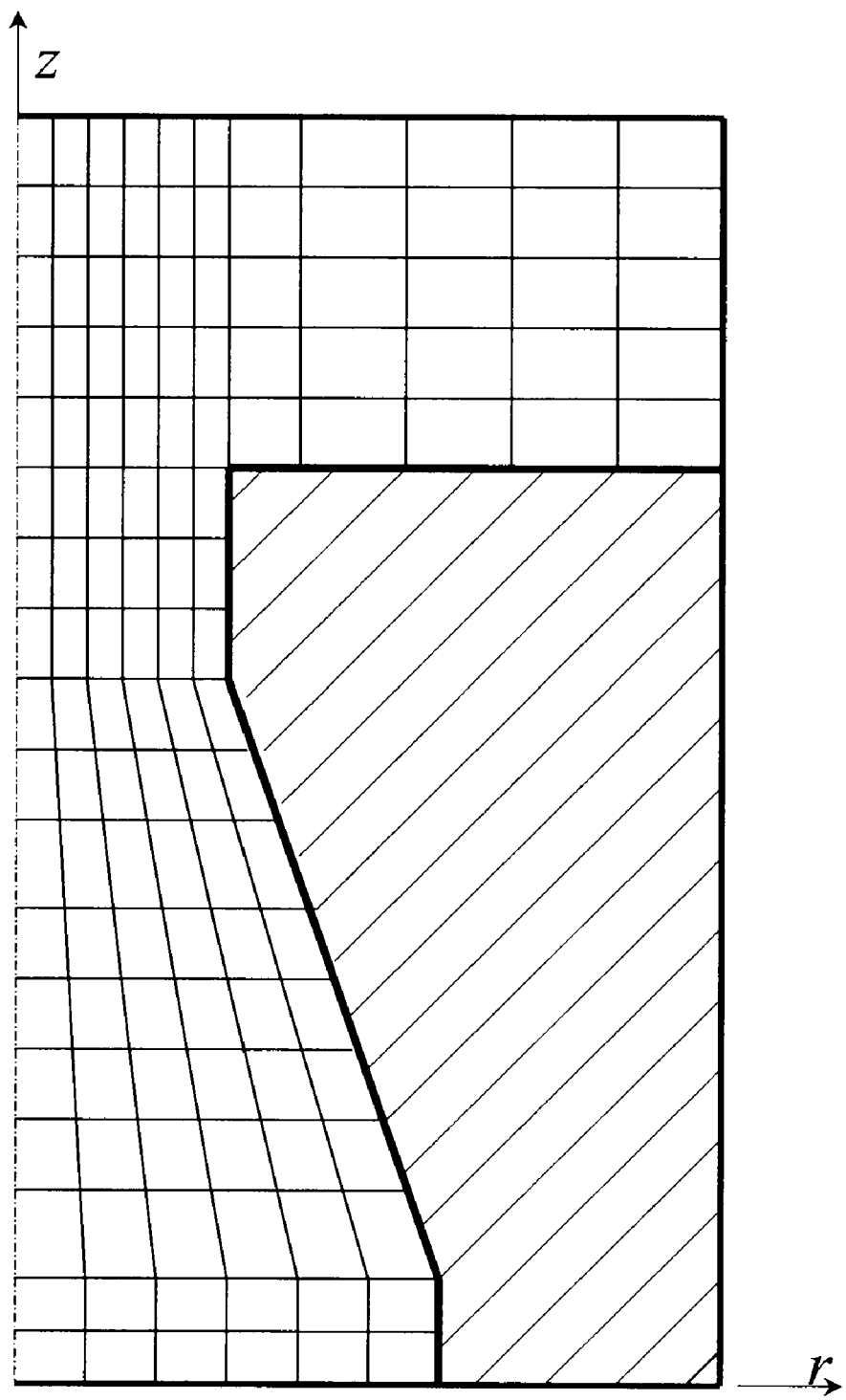
FIG. 3 shows a boundary-fitted quadrilateral grid for inkjet simulation, in accordance with one embodiment of the present invention.
Figure 8:
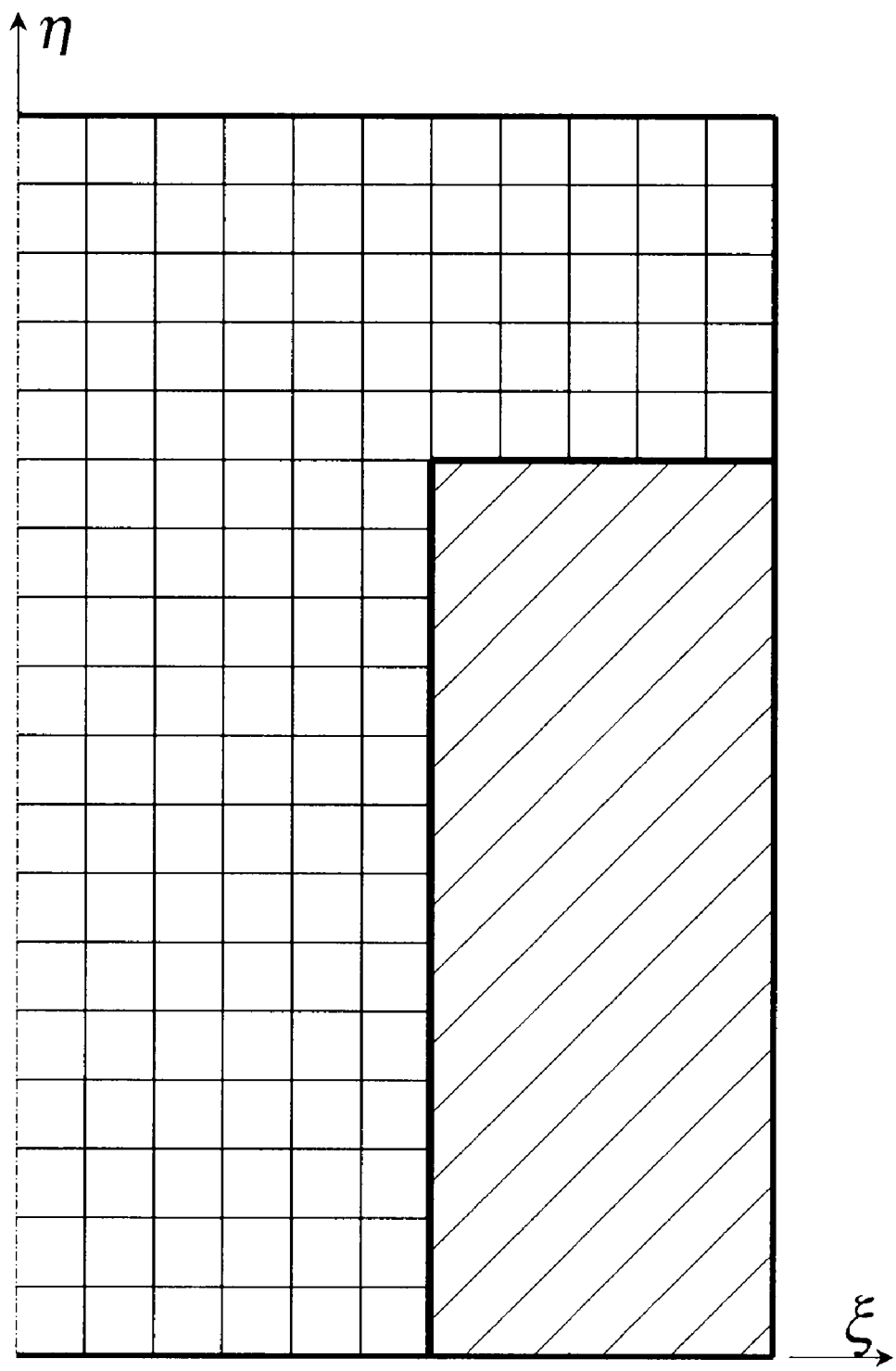
FIG. 8 shows a uniform square grid in computational space, in accordance with one embodiment of the present invention.

The transformation $X = \Phi(\Xi)$ is such that the grid in the computational space is composed of unit squares, i.e., the grid in the computational space has $\Delta\xi = \Delta\eta = 1$. The boundary-fitted quadrilateral grid and the nozzle wall in FIG. 3 are mapped to the uniform computational grid and the square hatched area in FIG. 8.

Equations 53, 54, and 55 are used to construct the linear system to solve. As mentioned above, equation (56) is a simplified case when the quadrilateral grid is reduced to a uniform square grid and is much simpler to solve. Additional details can be found in U.S. Pat. No. 7,117,138, which has been incorporated as a reference in its entirety.

D. Constraint on Time Step

Since the time integration scheme is second-order explicit for the convection term and first-order explicit for viscosity, the constraint on time step $\Delta t$ is determined by the CFL condition, surface tension, viscosity, and total acceleration, as shown in equation (57).

Figure 9:
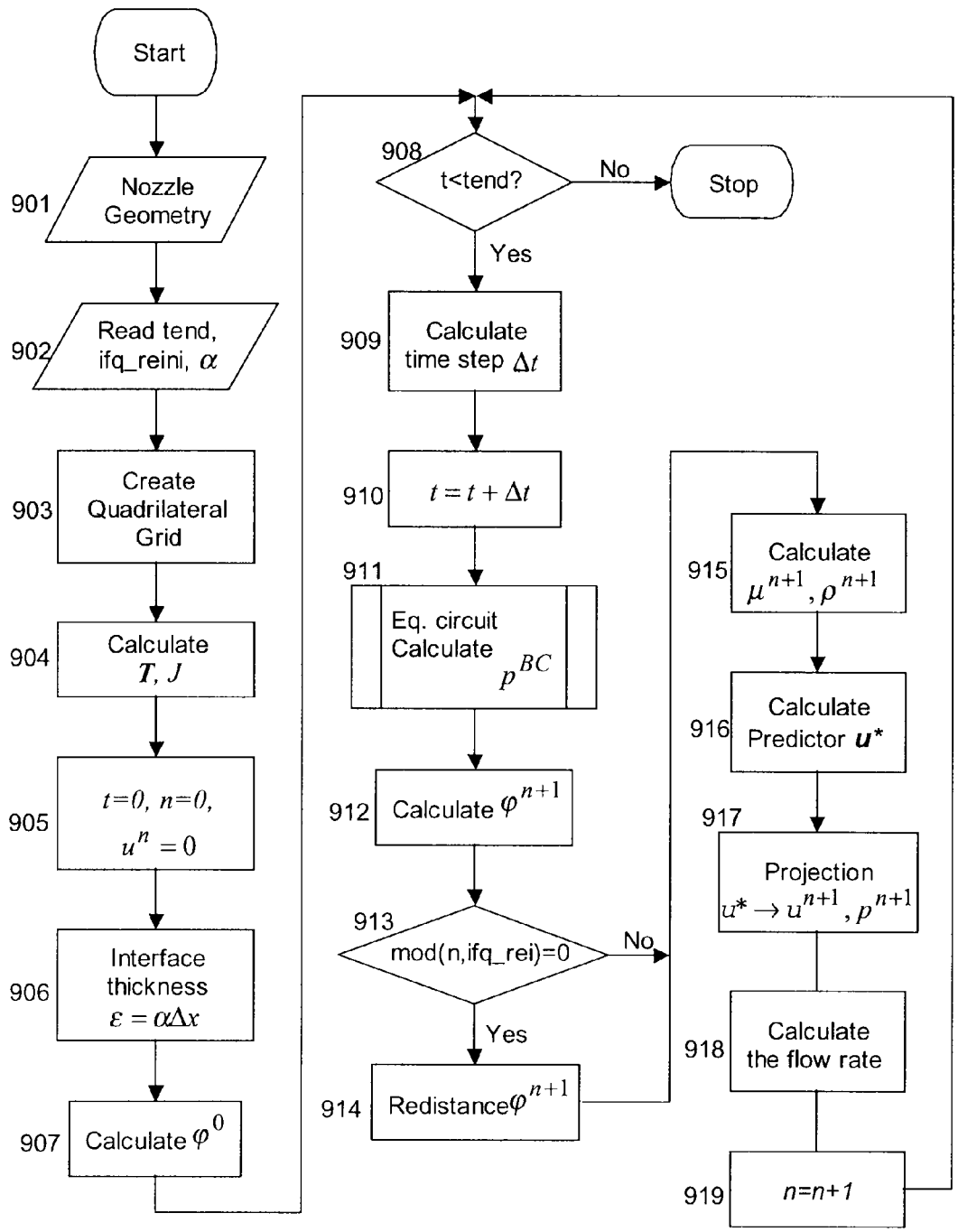
FIG. 9 shows a flow chart illustrating the numerical algorithm, in accordance with one embodiment of the present invention.

FIG. 9 shows a flow chart of ink-jet simulation, in accordance with one embodiment of the present invention. The numerical algorithm is basically sequential. The code first reads the nozzle geometry (step 901) and also reads control parameters like $t_{end}$ (end time of the simulation), $\alpha$ (the extent of interface smearing), ifq_reini (how often the level set should be re-initialized) (step 902). With the given nozzle geometry, the code creates a body-fitted quadrilateral grid like in FIG. 3 (step 903), and calculates the transformation matrix T and the Jacobian J using equation (12) (step 904). The time and the number of the current time step are set to zero and the initial fluid velocity is set to zero everywhere (step 905). With the given smearing parameter ($\alpha$), the interface thickness is set using equation (35) (step 906). The level set $\phi^0$ is then initialized by assuming the initial ink-air interface is flat (step 907).

Now the time loop starts by checking whether $t < t_{end}$ (step 908). If so, the time step $\Delta t$ is determined by equation (57) to ensure the stability of the code (step 909). The time is updated (step 910). The time step and the ink flow rate (the initial flow rate is zero) are then passed to an equivalent circuit or like analytic tool, which calculates the inflow pressure for the current time step (step 911). After receiving the inflow velocity from the equivalent circuit, the CFD code goes ahead to solve the partial differential equations. The level set is first updated using equation (36) (step 912) and, for every ifq_reini time steps, is also re-distanced (steps 913 and 914). The new fluid viscosity and density are calculated using the new level set values (step 915). The velocity predictor equation (39) is then calculated (step 916).

Finally, the predictor velocity is projected into the divergence-free space to get the new pressure and incompressible velocity fields (step 917). The embodiments described above provide a method of interpolating pressure and velocity with a five-point stencil (a bandwidth of five), which speeds up the calculation of pressure at this step, in comparison to using a FEM with a bandwidth of nine. Equations 53, 54, and 55 are solved to interpolate pressure. As mentioned above, after pressure value is interpolated ($p^{n+1}$), $u^{n+1}$ can be calculated by equation (40). The computation at this step consumes significant amount of computing resources, such as about between about 40% to about 60% of resources. Solving matrixes with bandwidth of five, instead of nine, could drastically reduce the resources and time took to finish the computational tasks. The last things to do in the loop are calculating the ink flow rate (step 918) and updating the number of the time step (step 919).

The simulation model, namely, a discrete transformation for transferring a quadrilateral grid in the physical space to a uniform square grid in the computational space to enable finite-difference-based ink-jet simulation; derivation of governing partial differential equations, including derivation of the viscosity term, the surface tension term, and the level set convection equation for two-phase flows, on the quadrilateral grid; transformation of those equations for application on the uniform square grid; and development of a stable and powerful numerical algorithm to solve the derived and transformed equations, provide a more accurate way to simulate and analyze ink ejection that overcomes the previously encountered problems and enable more precise control of ink droplet size and shape.

Figure 10:
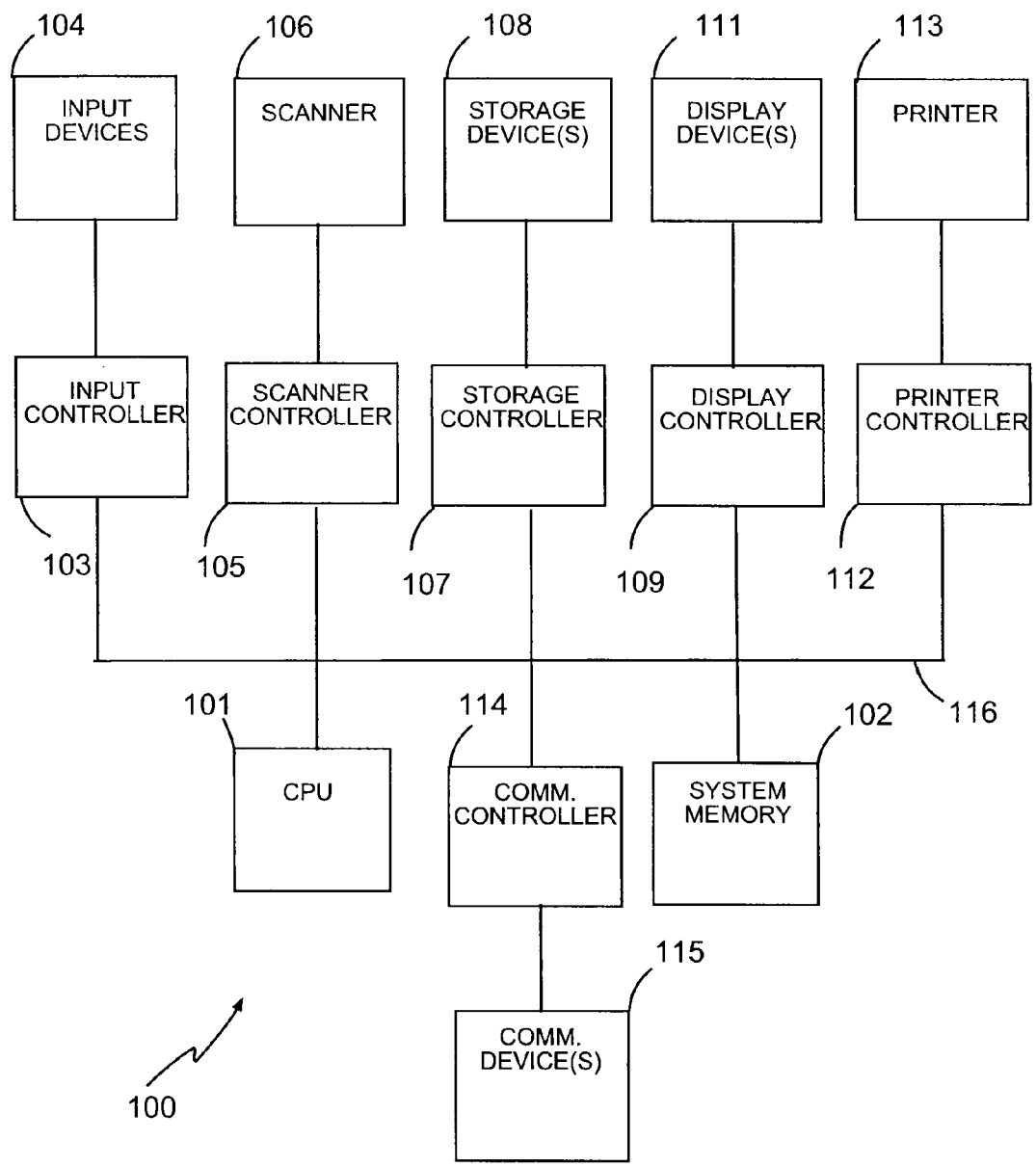
FIG. 10 shows a system that may be used to implement aspects of the present invention, in accordance with one embodiment of the present invention.

Having described the details of the invention, an exemplary system 100 which may be used to implement one or more aspects of the present invention will now be described with reference to FIG. 10. As illustrated in FIG. 10, the system includes a central processing unit (CPU) 101 that provides computing resources and controls the computer. CPU 101 may be implemented with a microprocessor or the like, and may also include a graphics processor and/or a floating point coprocessor for mathematical computations. System 100 further includes system memory 102 which may be in the form of random-access memory (RAM) and read-only memory (ROM).

A number of controllers and peripheral devices are also provided, as shown in FIG. 10. Input controller 103 represents an interface to various input devices 104, such as a keyboard, mouse or stylus. There is also a controller 105, which communicates with a scanner 106. A storage controller 107 interfaces with one or more storage devices 108 each of which includes a storage medium such as magnetic tape or disk, or an optical medium that may be used to record programs of instructions for operating systems, utilities and applications which may include embodiments of programs that implement various aspects of the present invention. Storage device(s) 108 may also be used to store processed or data to be processed in accordance with the invention. A display controller 109 provides an interface to a display device 111 which may be a cathode ray tube (CRT) or thin film transistor (TFT) display. A printer controller 112 is also provided for communicating with a printer 113. A communications controller 114 interfaces with one or more communication devices 115, which enables system 100 to connect to remote devices through any of a variety of networks including the Internet, a local area network (LAN), a wide area network (WAN), or through any suitable electromagnetic carrier signals including infrared signals.

In the illustrated system, all major system components connect to bus 116 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium. Machine-readable medium are divided into two groups, one being storage medium and the other being transmission medium. Storage medium includes magnetic tape or disk or optical disc. Transmission medium includes any other suitable electromagnetic carrier signals including infrared signals.

The present invention may be conveniently implemented with software. However, alternative implementations are certainly possible, including a hardware and/or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

$$\nabla \cdot u = 0. \tag{1}$$

$$\rho(\phi)\frac{Du}{Dt} = -\nabla p + \nabla \cdot (2\mu(\phi)\mathcal{D}) - \sigma\kappa(\phi)\delta(\phi)\nabla\phi. \tag{2}$$

$$\mathcal{D} = \frac{1}{2}[\nabla u + (\nabla u)^T], \tag{3}$$

$$u = ue_1 + ve_2.$$

$$\phi(x, y, t) \begin{cases} < 0 & \text{if } (x, y) \in \text{ fluid \#2 (air)} \\ = 0 & \text{if } (x, y) \in \text{ interface} \\ > 0 & \text{if } (x, y) \in \text{ fluid \#1 (ink).} \end{cases} \tag{4}$$

$$n = \frac{\nabla\phi}{|\nabla\phi|}\bigg|_{\phi=0}, \tag{5}$$

$$\kappa = \nabla \cdot \left(\frac{\nabla\phi}{|\nabla\phi|}\right)\bigg|_{\phi=0}.$$

$$x = Lx', \, y = Ly', \, u = Uu', \, t = \frac{L}{U}t', \tag{6}$$

$$p = \rho_1 U^2 p', \, \rho = \rho_1 \rho', \, \mu = \mu_1 \mu'.$$

$$\nabla \cdot u = 0. \tag{7}$$

$$\frac{Du}{Dt} = -\frac{1}{\rho(\phi)}\nabla p + \frac{1}{\rho(\phi)\text{Re}}\nabla \cdot (2\mu(\phi)\mathcal{D}) - \frac{1}{\rho(\phi)\text{We}}\kappa(\phi)\delta(\phi)\nabla\phi. \tag{8}$$

-continued $$\rho(\phi) = \begin{cases} 1 & \text{if } \phi \geq 0 \\ \rho_2/\rho_1 & \text{if } \phi < 0 \end{cases},$$

$$\mu(\phi) = \begin{cases} 1 & \text{if } \phi \geq 0 \\ \mu_2/\mu_1 & \text{if } \phi < 0 \end{cases},$$

$$\text{Re} = \frac{\rho_1 U L}{\mu_1},$$

$$We = \frac{\rho_1 U^2 L}{\sigma}.$$

(9)

$$\frac{\partial \phi}{\partial t} + u \cdot \nabla \phi = 0. \tag{10}$$

$$X = \Phi(\Xi). \tag{11}$$

$$J = g \det \nabla_\Xi \Phi = g \det \begin{pmatrix} x_\xi & x_\eta \\ y_\xi & y_\eta \end{pmatrix}, \tag{12}$$

$$T = g^{-1} J [\nabla_\Xi \Phi]^{-1} = \begin{pmatrix} y_\eta & -x_\eta \\ -y_\xi & x_\xi \end{pmatrix}.$$

$$\bar{u} = gTu. \tag{13}$$

$$x \to r,\ y \to z,\ g \to 2\pi r. \tag{14}$$

$$\nabla p = \begin{pmatrix} p_x \\ p_y \end{pmatrix} = \begin{pmatrix} p_\xi \xi_x + p_\eta \eta_x \\ p_\xi \xi_x + p_\eta \eta_y \end{pmatrix} \tag{15}$$

$$= \begin{pmatrix} \xi_x & \eta_x \\ \xi_y & \eta_y \end{pmatrix} \begin{pmatrix} p_\xi \\ p_\eta \end{pmatrix}$$

$$= g J^{-1} \begin{pmatrix} y_\eta & -y_\xi \\ -x_\eta & x_\xi \end{pmatrix} \begin{pmatrix} p_\xi \\ p_\eta \end{pmatrix}$$

$$= g J^{-1} T^T \nabla_\Xi p.$$

$$\nabla \cdot u = J^{-1} \nabla_\Xi \cdot \bar{u}. \tag{16}$$

$$\nabla_\Xi \cdot \bar{u} = \nabla_\Xi \cdot \left[ g \begin{pmatrix} y_\eta & -x_\eta \\ -y_\xi & x_\xi \end{pmatrix} \begin{pmatrix} u \\ v \end{pmatrix} \right] \tag{17}$$

$$= g_{,\xi}(uy_\eta - vx_\eta) + g(uy_\eta - vx_\eta)_{,\xi} + g_{,\eta}(vx_\xi - uy_\xi) +$$

$$\quad g(vx_\xi - uy_\xi)_{,\eta}$$

$$= [(x_\xi y_\eta - x_\eta y_\xi)u + (u_\xi y_\eta - u_\eta y_\xi - v_\xi x_\eta + v_\eta x_\xi)]$$

$$= \{(x_\xi y_\eta - x_\eta y_\xi)u + [y_\eta(u_x x_\xi + u_y y_\xi) - y_\xi(u_x x_\eta + u_y y_\eta) -$$

$$\quad r_\eta(v_r r_\xi + v_z z_\xi) + r_\xi(v_r r_\eta + v_z z_\eta)]\}$$

$$= [(x_\xi y_\eta - x_\eta y_\xi)u + (x_\xi y_\eta - x_\eta y_\xi)(u_x + v_y)]$$

$$= J \nabla \cdot u.$$

$$(u \cdot \nabla)u = [u \cdot (g J^{-1} T^T \nabla_\Xi)]u \tag{18}$$

$$= J^{-1}[(gTu) \cdot \nabla_\xi]u = J^{-1}(\bar{u} \cdot \nabla_\Xi)u.$$

$$\nabla \cdot (2\mu(\phi)\mathcal{D}) = [\nabla \mu(\phi)] \cdot [(\nabla u) + (\nabla u)^T] + \mu(\phi)\nabla \cdot [(\nabla u) + (\nabla u)^T]. \tag{19}$$

$$\nabla \cdot [(\nabla u)^T] = 0. \tag{20}$$

$$\frac{1}{\rho(\phi)\text{Re}} \nabla \cdot [2\mu(\phi)\mathcal{D}] = \tag{21}$$

$$\frac{g}{J\rho(\phi)\text{Re}} [T^T \nabla_\Xi \mu(\phi)] \cdot \left[ gJ^{-1} T^T \nabla_\Xi u + (gJ^{-1} T^T \nabla_\Xi u)^T \right] + \frac{\mu(\phi)}{\rho(\phi)\text{Re}} \nabla^2 u.$$

$$\nabla \cdot \nabla u = \begin{pmatrix} \frac{\partial}{\partial x} \\ \frac{\partial}{\partial y} \end{pmatrix} \cdot \left\{ \begin{pmatrix} u_x & v_x \\ u_y & v_y \end{pmatrix} \right\}. \tag{22}$$

$$\begin{pmatrix} u_x & v_x \\ u_y & v_y \end{pmatrix} = \begin{pmatrix} \xi_x & \eta_x \\ \xi_y & \eta_y \end{pmatrix} \begin{pmatrix} u_\xi & v_\xi \\ u_\eta & v_\eta \end{pmatrix} = g J^{-1} T^T \begin{pmatrix} u_\xi & v_\xi \\ u_\eta & v_\eta \end{pmatrix}. \tag{23}$$

$$\begin{pmatrix} \frac{\partial}{\partial x} \\ \frac{\partial}{\partial y} \end{pmatrix} \cdot \begin{pmatrix} \alpha & \beta \\ \gamma & \delta \end{pmatrix} = gJ^{-1} \begin{pmatrix} \frac{\partial}{\partial \xi} \\ \frac{\partial}{\partial \eta} \end{pmatrix} \cdot \left\{ \begin{pmatrix} y_\eta & -x_\eta \\ -y_\xi & x_\xi \end{pmatrix} \begin{pmatrix} \alpha & \beta \\ \gamma & \delta \end{pmatrix} \right\} = gJ^{-1}\nabla_\Xi \cdot \left\{ T \begin{pmatrix} \alpha & \beta \\ \gamma & \delta \end{pmatrix} \right\}. \tag{24}$$

$$\frac{\mu(\phi)}{\rho(\phi)\mathrm{Re}} \nabla \cdot \nabla u = \frac{\mu(\phi)}{J\rho(\phi)\mathrm{Re}} \nabla_\Xi \cdot \{g^2 J^{-1} T T^T \nabla_\Xi u\}. \tag{25}$$

$$\frac{1}{\rho(\phi)\mathrm{Re}} \nabla \cdot [2\mu(\phi)\mathcal{D}] = \tag{26}$$
$$\frac{g}{J\rho(\phi)\mathrm{Re}} [T^T \nabla_\Xi \mu(\phi)] \cdot \left[ gJ^{-1}T^T\nabla_\Xi u + (gJ^{-1}T^T\nabla_\Xi u)^T \right] + \frac{\mu(\phi)}{J\rho(\phi)\mathrm{Re}} \nabla_\Xi \cdot \{g^2 J^{-1} T T^T \nabla_\Xi u\}.$$

$$\kappa(\phi) = \nabla \cdot \left( \frac{\nabla \phi}{|\nabla \phi|} \right) = J^{-1} \nabla_\Xi \cdot \left( gT \frac{T^T \nabla_\Xi \phi}{|T^T \nabla_\Xi \phi|} \right). \tag{27}$$

$$-\frac{g\delta(\phi)}{J^2 \rho(\phi)We} \nabla_\Xi \cdot \left( gT \frac{T^T \nabla_\Xi \phi}{|T^T \nabla_\Xi \phi|} \right)(T^T \nabla_\Xi \phi). \tag{28}$$

$$\frac{\partial u}{\partial t} + J^{-1}(\bar{u}\cdot\nabla_\Xi)u = \tag{29}$$
$$-\frac{1}{\rho(\phi)J} gT^T \nabla_\Xi p + (\text{Viscosity term}) - \frac{g\delta(\phi)}{J^2 \rho(\phi)We} \nabla_\Xi \cdot \left( gT \frac{T^T \nabla_\Xi \phi}{|T^T \nabla_\Xi \phi|} \right)(T^T \nabla_\Xi \phi),$$
$$\nabla_\Xi \cdot \bar{u} = 0, \frac{\partial \phi}{\partial t} + J^{-1} \bar{u} \cdot \nabla_\Xi \phi = 0.$$

$$u = u^{BC} \tag{30}$$

$$p = p^{BC}, \frac{\partial u}{\partial n} = 0. \tag{31}$$

$$u^n = u(t = n\Delta t) \tag{32}$$

$$H(\phi) = \begin{cases} 0 & \text{if } \phi < -\epsilon \\ \frac{1}{2}\left[1 + \frac{\phi}{\epsilon} + \frac{1}{\pi}\sin(\pi\phi/\epsilon)\right] & \text{if } |\phi| \le \epsilon \\ 1 & \text{if } \phi > \epsilon \end{cases} \tag{33}$$

$$\delta(\phi) = \frac{dH(\phi)}{d\phi}. \tag{34}$$

$$\epsilon = \alpha \Delta x. \tag{35}$$

$$\phi^{n+1} = \phi^n - \frac{\Delta t}{J}[\bar{u}\cdot\nabla_\Xi \phi]^{n+1/2}. \tag{36}$$

$$\phi^{n+1/2} = \frac{1}{2}(\phi^n + \phi^{n+1}). \tag{37}$$

$$\frac{u^{n+1} - u^n}{\Delta t} + J^{-1}[(\bar{u}\cdot\nabla_\Xi)u]^{n+1/2} = \tag{38}$$
$$-\frac{g}{\rho(\phi^{n+1/2})J} T^T \nabla_\Xi p^{n+1} + (\text{Viscosity term})^n + (\text{Surface tension})^{n+1/2}.$$

$$u^* = u^n + \Delta t\{-J^{-1}[(\bar{u}\cdot\nabla_\Xi)u]^{n+1/2} + (\text{Viscosity term})^n (\text{Surface tension})^{n+1/2}\}. \tag{39}$$

$$u^{n+1} = u^* - \frac{g\Delta t}{\rho(\phi^{n+1/2})J} T^T \nabla_\Xi p^{n+1}. \tag{40}$$

$$u^{n+1} = u^* - \frac{\Delta t}{\rho(\phi^{n+1/2})} \nabla p^{n+1}. \tag{41}$$

$$\nabla \cdot u^* = \nabla \cdot \left( \frac{\Delta t}{\rho(\phi^{n+1/2})} \nabla p^{n+1} \right). \tag{42}$$

$$\int_\Omega \frac{\Delta t}{\rho^{n+1/2}} \nabla p^{n+1} \cdot \nabla \psi dx = \int_\Omega u^* \cdot \nabla \psi dx - \int_{\Gamma_1} \psi u^{BC} \cdot n dS. \tag{43}$$

$$u = u^{BC}. \tag{44}$$

-continued $$\frac{\Delta t}{6\rho_{i,j}}(2p_{i-1,j-1} + p_{i-1,j} + p_{i,j-1} - 4p_{i,j}) + \frac{\Delta t}{6\rho_{i+1,j}}(2p_{i+1,j-1} + p_{i,j-1} + p_{i+1,j} - 4p_{i,j}) + \quad (45)$$

$$\frac{\Delta t}{6\rho_{i,j+1}}(2p_{i-1,j+1} + p_{i-1,j} + p_{i,j+1} - 4p_{i,j}) +$$

$$\frac{\Delta t}{6\rho_{i+1,j+1}}(2p_{i+1,j+1} + p_{i+1,j} + p_{i,j+1} - 4p_{i,j}) = \Delta x \begin{pmatrix} \frac{u^*_{i+1,j+1} - u^*_{i,j+1} + u^*_{i+1,j} - u^*_{i,j}}{2} + \\ \frac{v^*_{i+1,j+1} - v^*_{i+1,j} + v^*_{i,j+1} - v^*_{i,j}}{2} \end{pmatrix}.$$

$$\psi_{i,j} = ax + by + c, \quad (46)$$

$$\begin{pmatrix} x_{i,j} & y_{i,j} & 1 \\ x_{i-1,j} & y_{i-1,j} & 1 \\ x_{i,j-1} & y_{i,j-1} & 1 \end{pmatrix} \begin{pmatrix} a_1 \\ b_1 \\ c_1 \end{pmatrix} = \begin{pmatrix} 1 \\ 0 \\ 0 \end{pmatrix} \quad \text{if } (x, y) \text{ in } A_1 \quad (47)$$

$$\begin{pmatrix} x_{i,j} & y_{i,j} & 1 \\ x_{i+1,j} & y_{i+1,j} & 1 \\ x_{i,j-1} & y_{i,j-1} & 1 \end{pmatrix} \begin{pmatrix} a_2 \\ b_2 \\ c_2 \end{pmatrix} = \begin{pmatrix} 1 \\ 0 \\ 0 \end{pmatrix} \quad \text{if } (x, y) \text{ in } A_2$$

$$\begin{pmatrix} x_{i,j} & y_{i,j} & 1 \\ x_{i-1,j} & y_{i-1,j} & 1 \\ x_{i,j+1} & y_{i,j+1} & 1 \end{pmatrix} \begin{pmatrix} a_3 \\ b_3 \\ c_3 \end{pmatrix} = \begin{pmatrix} 1 \\ 0 \\ 0 \end{pmatrix} \quad \text{if } (x, y) \text{ in } A_3$$

$$\begin{pmatrix} x_{i,j} & y_{i,j} & 1 \\ x_{i+1,j} & y_{i+1,j} & 1 \\ x_{i,j+1} & y_{i,j+1} & 1 \end{pmatrix} \begin{pmatrix} a_4 \\ b_4 \\ c_4 \end{pmatrix} = \begin{pmatrix} 1 \\ 0 \\ 0 \end{pmatrix} \quad \text{if } (x, y) \text{ in } A_4$$

$$\psi_{i,j} = (\xi - \xi_{i,j}) + (\eta - \eta_{i,j}) + 1 \quad \text{if } (\xi, \eta) \text{ in } A_1, \quad (48)$$
$$= -(\xi - \xi_{i,j}) + (\eta - \eta_{i,j}) + 1 \quad \text{if } (\xi, \eta) \text{ in } A_2,$$
$$= (\xi - \xi_{i,j}) - (\eta - \eta_{i,j}) + 1 \quad \text{if } (\xi, \eta) \text{ in } A_3,$$
$$= -(\xi - \xi_{i,j}) - (\eta - \eta_{i,j}) + 1 \quad \text{if } (\xi, \eta) \text{ in } A_4,$$

$$p = p_{i,j}\theta_{i,j} + p_{i-1,j}\theta_{i-1,j} + p_{i,j-1}\theta_{i,j-1} \quad \text{if } (x, y) \text{ in } A_1, \quad (49)$$
$$p = p_{i,j}\theta_{i,j} + p_{i+1,j}\theta_{i+1,j} + p_{i,j-1}\theta_{i,j-1} \quad \text{if } (x, y) \text{ in } A_2,$$
$$p = p_{i,j}\theta_{i,j} + p_{i-1,j}\theta_{i-1,j} + p_{i,j+1}\theta_{i,j+1} \quad \text{if } (x, y) \text{ in } A_3,$$
$$p = p_{i,j}\theta_{i,j} + p_{i+1,j}\theta_{i+1,j} + p_{i,j+1}\theta_{i,j+1} \quad \text{if } (x, y) \text{ in } A_4,$$

$$\theta_{i+1,j} = dx + ey + f, \quad (50)$$

$$\begin{pmatrix} x_{i+1,j} & y_{i+1,j} & 1 \\ x_{i,j} & y_{i,j} & 1 \\ x_{i,j-1} & y_{i,j-1} & 1 \end{pmatrix} \begin{pmatrix} d_2 \\ e_2 \\ f_2 \end{pmatrix} = \begin{pmatrix} 1 \\ 0 \\ 0 \end{pmatrix} \quad \text{if } (x, y) \text{ in } A_2, \quad (51)$$

$$\begin{pmatrix} x_{i+1,j} & y_{i+1,j} & 1 \\ x_{i,j+1} & y_{i,j+1} & 1 \\ x_{i,j} & y_{i,j} & 1 \end{pmatrix} \begin{pmatrix} d_4 \\ e_4 \\ f_4 \end{pmatrix} = \begin{pmatrix} 1 \\ 0 \\ 0 \end{pmatrix} \quad \text{if } (x, y) \text{ in } A_4.$$

$$p = p_{i,j}[(\xi - \xi_{i,j}) + (\eta - \eta_{i,j}) + 1] + p_{i-1,j}(\xi_{i,j} - \xi) + p_{i,j-1}(\eta_{i,j} - \eta) \quad \text{if } (\xi, \eta) \text{ in } A_1 \quad (52)$$
$$= p_{i,j}[(\xi_{i,j} - \xi) + (\eta - \eta_{i,j}) + 1] + p_{i+1,j}(\xi - \xi_{i,j}) + p_{i,j-1}(\eta_{i,j} - \eta) \quad \text{if } (\xi, \eta) \text{ in } A_2$$
$$= p_{i,j}[(\xi - \xi_{i,j}) - (\eta - \eta_{i,j}) + 1] + p_{i-1,j}(\xi_{i,j} - \xi) + p_{i,j+1}(\eta - \eta_{i,j}) \quad \text{if } (\xi, \eta) \text{ in } A_3$$
$$= p_{i,j}[(\xi_{i,j} - \xi) - (\eta - \eta_{i,j}) + 1] + p_{i+1,j}(\xi - \xi_{i,j}) + p_{i,j+1}(\eta - \eta_{i,j}) \quad \text{if } (\xi, \eta) \text{ in } A_4.$$

$$\int_\Omega \frac{\Delta t}{\rho} \nabla \psi_{i,j} \cdot \nabla p \, dx = \int_{A_1} \frac{\Delta t}{J_{i,j}\rho_{i,j}} \left[ T_{i,j}^T (1, 1)^T \right] \cdot \left[ T_{i,j}^T (p_{i,j} - p_{i-1,j}, p_{i,j} - p_{i,j-1})^T \right] d\xi d\eta + \quad (53)$$

$$\int_{A_2} \frac{\Delta t}{J_{i+1,j}\rho_{i+1,j}} \left[ T_{i+1,j}^T (-1, 1)^T \right] \cdot \left[ T_{i+1,j}^T (-p_{i,j} + p_{i+1,j}, p_{i,j} - p_{i,j-1})^T \right] d\xi d\eta +$$

$$\int_{A_3} \frac{\Delta t}{J_{i+1,j+1}\rho_{i+1,j+1}} \left[ T_{i+1,j+1}^T (1, -1)^T \right] \cdot \left[ T_{i+1,j+1}^T (p_{i,j} - p_{i-1,j}, -p_{i,j} + p_{i,j+1})^T \right] d\xi d\eta +$$

$$\int_{A_4} \frac{\Delta t}{J_{i,j+1}\rho_{i,j+1}} \left[ T_{i,j+1}^T (-1, -1)^T \right] \cdot \left[ T_{i,j+1}^T (-p_{i,j} + p_{i+1,j}, -p_{i,j} + p_{i,j+1})^T \right] d\xi d\eta,$$

-continued $$\int_\Omega \nabla \psi_{i,j} \cdot u^* dx = \int_{A_1} [T_{i,j}^T(1,1)^T] \cdot u_{i,j}^* d\xi d\eta + \int_{A_2} [T_{i+1,j}^T(-1,1)^T] \cdot u_{i+1,j}^* d\xi d\eta + \int_{A_3} [T_{i+1,j+1}^T(1,-1)^T] \cdot u_{i+1,j+1}^* d\xi d\eta + \int_{A_4} [T_{i,j+1}^T(-1,-1)^T] \cdot u_{i,j+1}^* d\xi d\eta, \quad (54)$$

$$J_{i,j} = \det \nabla_\Xi \Phi|_{i,j} = \det \begin{pmatrix} x_\xi & x_\eta \\ y_\xi & y_\eta \end{pmatrix}_{i,j}, \quad (55)$$

$$T_{i,j} = J_{i,j}[\nabla_\Xi \Phi]_{i,j}^{-1} = \begin{pmatrix} y_\eta & -x_\eta \\ -y_\xi & x_\xi \end{pmatrix}_{i,j}.$$

$$\frac{\Delta t}{2\rho_{i,j}}(p_{i-1,j} + p_{i,j-1} - 2p_{i,j}) + \frac{\Delta t}{2\rho_{i+1,j}}(p_{i,j-1} + p_{i+1,j} - 2p_{i,j}) + \frac{\Delta t}{2\rho_{i,j+1}}(p_{i-1,j} + p_{i,j+1} - 2p_{i,j}) + \frac{\Delta t}{2\rho_{i+1,j+1}}(p_{i+1,j} + p_{i,j+1} - 2p_{i,j}) = \Delta x \left( \frac{u_{i+1,j+1}^* - u_{i,j+1}^* + u_{i+1,j}^* - u_{i,j}^*}{2} + \frac{v_{i+1,j+1}^* - v_{i+1,j}^* + v_{i,j+1}^* - v_{i,j}^*}{2} \right). \quad (56)$$

$$\Delta t < \min_{i,j} \left[ \frac{\Delta x}{u}, \frac{\Delta y}{v}, \sqrt{We \frac{\rho_1 + \rho_2}{8\pi} h^{3/2}}, \frac{Re}{2} \frac{\rho^n}{\mu^n} \left( \frac{1}{\Delta x^2} + \frac{1}{\Delta y^2} \right)^{-1}, \sqrt{\frac{2h}{|F|}} \right], \quad (57)$$

What is claimed is:

1. A method for simulating and analyzing fluid ejection from a channel, there being a boundary between a first fluid that flows through the channel and a second fluid, the method comprising:
   (a) transforming, for a given channel geometry, a quadrilateral grid in a physical space to a uniform rectangular grid in a computational space;
   (b) performing finite difference analysis on the uniform rectangular grid to solve equations governing the flow of at least the first fluid through the channel, wherein the finite element analysis of an incompressible continuity equation of the equations, for projection of fluid velocity of at least the first fluid, is formulated by a two-dimensional (2-D)-five-point-stencil-based non-finite-element-method (non-FEM) discretization to obtain and solve a linear system whose coefficient matrix has an average bandwidth of five;
   (c) inverse transforming results of the finite difference analysis back to the quadrilateral grid in the physical space; and
   (d) simulating the flow of the first fluid through at least a portion of the channel, and ejection therefrom, based on the results of the finite difference analysis and the inverse transform of the results of the finite difference analysis.

2. The method of claim 1, wherein weighting functions for the incompressible continuity equation have a value of 1 at a center node and have values of 0 at four surrounding nodes of each 2-D five-point stencil, and wherein the weighting functions are piecewise linear with coordinates of the uniform rectangular grid.

3. The method of claim 2, wherein shape functions are utilized for interpolating pressure in operation (b), and the shape functions have values of 1 at associated nodes and values of zero at other nodes, and wherein the shape functions are piecewise linear with coordinates of the uniform rectangular grid.

4. The method of claim 3, wherein the weighting functions and the shape functions are different to guarantee the 2-D-five-point-stencil-based non-FEM discretization can be achieved.

5. The method of claim 1, wherein the first fluid is ink, the second fluid is air, and the channel comprises an ink jet nozzle that is part of a piezoelectric ink jet head.

6. The method of claim 1, wherein, in performing operation (b), a level set method is used to capture characteristics of the boundary in the channel.

7. The method of claim 1, wherein the uniform rectangular grid comprises a plurality of cells, the 2-D-five-point-stencil-based non-FEM discretization being formulated such that, for each cell there being a velocity vector for determining velocity of the first fluid and a level set value for capturing characteristics of the boundary in the channel.

8. The method of claim 1, wherein operation (b) includes constructing multi-grid compatible projection operators, including a finite difference projection operator and a finite element projection operator.

9. An hardware apparatus for simulating and analyzing fluid ejection from a channel, there being a boundary between a first fluid that flows through the channel and a second fluid, the apparatus comprising one or more components or modules configured to:
   transform, for a given channel geometry, a quadrilateral grid in a physical space to a uniform rectangular grid in a computational space;
   perform finite difference analysis on a uniform rectangular grid to solve equations governing the flow of at least the first fluid through the channel, wherein the finite element analysis of an incompressible continuity equation of the equations, for projection of fluid velocity of at least the first fluid, is formulated by a 2-D-five-point-stencil-based non-FEM discretization to obtain and solve a linear system whose coefficient matrix has an average bandwidth of five;
   inverse transform results of the finite difference analysis back to the quadrilateral grid in the physical space; and
   simulate the flow of the first fluid through, and ejection from, the channel based on the finite difference analysis and the inverse transform of the results of the finite difference analysis.

10. The hardware apparatus of claim 9, wherein the one or more components or modules comprises a display for visually observing the simulation.

11. The hardware apparatus of claim 9, wherein the first fluid is ink, the second fluid is air, and the channel comprises an ink jet nozzle that is part of a piezoelectric ink jet head.

12. A non-transitory machine-readable medium having a program of instructions for directing a machine to perform a method for simulating and analyzing fluid ejection from a channel, there being a boundary between a first fluid that flows through the channel and a second fluid, the program of instructions comprising:
  (a) instructions for transforming, for a given channel geometry, a quadrilateral grid in a physical space to a uniform rectangular grid in a computational space;
  (b) instructions for performing finite difference analysis on the uniform rectangular grid to solve equations governing the flow of at least the first fluid through the channel, wherein the finite element analysis of an incompressible continuity equation of the equations, for projection of fluid velocity of at least the first fluid, is formulated by a 2-D-five-point-stencil-based non-FEM discretization to obtain and solve a linear system whose coefficient matrix has an average bandwidth of five;
  (c) instructions for inverse transforming results of the finite difference analysis back to the quadrilateral grid in the physical space; and
  (d) instructions for simulating the flow of the first fluid through at least a portion of the channel, and ejection therefrom, based on the results of the finite difference analysis and the inverse transform of the results of the finite difference analysis.

13. The non-transitory machine-readable medium of claim 12, wherein, in executing instructions (b), a level set method is used to capture characteristics of the boundary in the channel.

14. The non-transitory machine-readable medium of claim 12, wherein the uniform rectangular grid comprises a plurality of uniform cells, the 2-D-five-point-stencil-based non-FEM discretization being formulated such that, for each uniform cell there is a velocity vector for determining velocity of the first fluid and a level set value for capturing characteristics of the boundary in the channel.

15. The machine-readable medium of claim 12, wherein instructions (b) include instructions for constructing multi-grid compatible projection operators, including a finite difference projection operator and a finite element projection operator.

16. A method of simulating an incompressible fluid by performing finite difference analysis, comprising:
  (a) transforming a quadrilateral grid in a physical space to a uniform rectangular grid in a computational space;
  (b) performing finite difference analysis on the uniform rectangular grid to solve equations governing the flow of the incompressible fluid, wherein the finite element analysis of a projection step is formulated by a 2-D-five-point-stencil-based non-FEM discretization to obtain and solve a linear system whose coefficient matrix has an average bandwidth of five;
  (c) inverse transforming the results of the finite difference analysis back to the quadrilateral grid in the physical space; and
  (d) simulating the incompressible fluid based on the results of the finite difference analysis and the inverse transform of the results of the finite difference analysis.

17. The method of claim 16, wherein weighting functions of an incompressible continuity equation of the equations have a value of 1 at a center node and have values of 0 at four surrounding nodes of each 2-D five-point stencil, and wherein the weighting functions are piecewise linear with coordinates of the uniform rectangular grid.

18. The method of claim 17, wherein shape functions are utilized for interpolating pressure in operation (b), and the shape functions have values of 1 at their own associated nodes and values of zero at other nodes, and wherein the shape functions are piecewise linear with coordinates of the uniform rectangular grid.

19. The method of claim 18, wherein the weighting functions and the shape functions are different to guarantee the 2-D-five-point-stencil-based non-FEM discretization can be achieved.

* * * * *